No. 831,301. PATENTED SEPT. 18, 1906.
F. A. RYTHER & G. H. ELLIS.
BALING PRESS.
APPLICATION FILED JAN. 2, 1906.

Witnesses:
J. M. Daggett.
T. H. Alfreds.

Inventors.
Frank A. Ryther.
AND
George H. Ellis
By J. C. Warnes
Attorney.

THE NORRIS PETERS CO., WASHINGTON, D. C.

No. 831,301. PATENTED SEPT. 18, 1906.
F. A. RYTHER & G. H. ELLIS.
BALING PRESS.
APPLICATION FILED JAN. 2, 1906.

Witnesses:
V. M. Daggett
D. H. Hynds

Inventors.
Franklin A. Ryther
AND
George H. Ellis
By J. C. Warner
Attorney.

No. 831,301. PATENTED SEPT. 18, 1906.
F. A. RYTHER & G. H. ELLIS.
BALING PRESS.
APPLICATION FILED JAN. 2, 1906.

Witnesses:

Inventors.
Frank A. Ryther
AND
George H. Ellis.
By their Attorney.

No. 831,301. PATENTED SEPT. 18, 1906.
F. A. RYTHER & G. H. ELLIS.
BALING PRESS.
APPLICATION FILED JAN. 2, 1906.

No. 831,301. PATENTED SEPT. 18, 1906.
F. A. RYTHER & G. H. ELLIS.
BALING PRESS.
APPLICATION FILED JAN. 2, 1906.

UNITED STATES PATENT OFFICE.

FRANK A. RYTHER AND GEORGE H. ELLIS, OF CHICAGO, ILLINOIS, ASSIGNORS TO INTERNATIONAL HARVESTER COMPANY, A CORPORATION OF NEW JERSEY.

BALING-PRESS.

No. 831,301.     Specification of Letters Patent.     Patented Sept. 18, 1906.

Application filed January 2, 1906. Serial No. 294,053.

*To all whom it may concern:*

Be it known that we, FRANK A. RYTHER and GEORGE H. ELLIS, citizens of the United States, residing at Chicago, in the county of Cook and State of Illinois, have invented a new and useful Improvement in Baling-Presses, of which the following is a complete specification.

This invention relates to presses of the class used in baling flax, straw, and other material in bundles or in which it is desired to preserve the full length of the straw unbroken for fiber purposes.

The object in view is to produce a continuously-operating baler of the vertical type, simple and durable in construction, and convenient to operate.

A further object of the invention consists in providing a baler of the above-mentioned type with an automatically-operated feeding and condensing device, and other improvements in the details of construction hereinafter described, and illustrated in the accompanying drawings, in which—

Fig. 3 represents a plan section of the feeding and compression chamber, as taken on the line 3 3 of Fig. 1.

In balers of the type herein described, in which the bundles are fed in horizontally, the bale is given a comparatively small depth and a considerable width, the constituent bundles thereof extending breadthwise of the bale. It therefore becomes necessary to apply the wires to what in a horizontally-arranged press would be the top and bottom of the bale. Hence to facilitate the tying of the same the baling-chamber is arranged vertically and the feeding and condensing chamber is arranged horizontally. An added advantage resulting from the vertically-disposed baling-chamber in a continuously-operating machine is that the weight of the superposed bales in the chamber will aid in compressing those in process of formation.

The body of the baler consists, essentially, of the framework forming the baling-chamber 1 and the framework forming the feed and condensing hopper 2, the former being disposed vertically and the latter being arranged horizontally and communicating with the lower end of said baling-chamber.

The press is portably mounted on the main supporting rear wheels 3 and the front wheels 4, above which is constructed the platform 5. The platforms 6 and 7 are arranged on opposite sides of the baling-chamber, and on these platforms the operators stand while tying the bales.

Figures 1, 6:
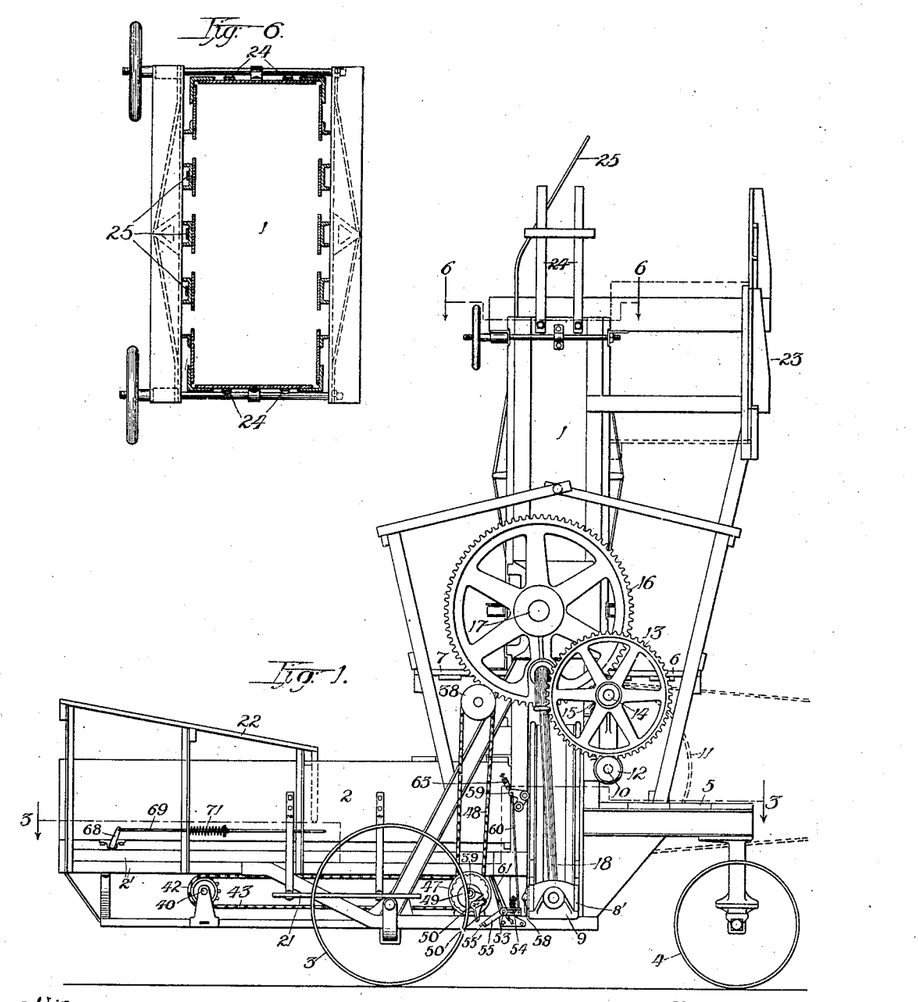
Figure 1 is a side elevation of the right-hand side of a complete baler embodying our invention.
Fig. 6 is a plan section of the baling-chamber, taken as indicated by the line 6 6 in Fig. 1.
Figure 2:
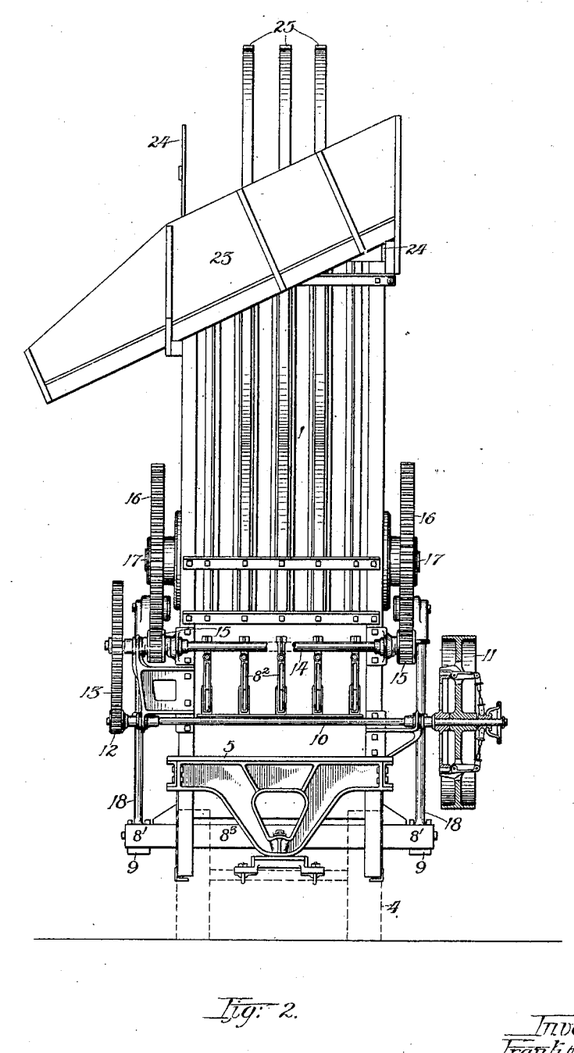
Fig. 2 is a front end elevation of the press with the front axle and wheels shown in dotted lines and the driving-pulley shown in section.

The vertically-reciprocating plunger 8 operates in the lower end of the baling-chamber 1, the top of said plunger, when in its lower position, lying slightly below the bottom of the feed-hopper 2, while the retaining-springs $8^2$ in said chamber 1 are arranged and operate in the usual manner. The plunger 8 has fixed on its under side the heavy bars $8^3$, the ends of which project and, in effect, form the laterally-projecting lugs $8'$, (see Figs. 1 to 3,) two on each side, to which is secured on each side of the plunger a pitman-head 9. The driving-shaft 10, (see Fig. 2,) which is mounted in suitable bearings fixed to the front side of the baling-chamber, has secured to one end the driving clutch-pulley 11 and to the other end the pinion 12. The pinion 12 meshes with and drives the gear 13 on the counter-shaft 14, to which is also secured the pinions 15, which in turn mesh with and drive the large gears 16. The gears 16 are mounted on stub-shafts 17, these stub-shafts being rigidly fixed on the sides of the baling-chamber 1 and central thereof, while the pitmen 18 connect said gears 16 with the pitman-heads 9 on the plunger 8. In this manner the proper speed reduction is effected and the pitmen for operating the plunger are placed in a central position, oppositely and laterally of said baling-chamber, thereby resulting in the parts being well balanced and the principal internal opposing strains central with respect to the bearings receiving same.

In order to provide sufficient time for the operation of the feeding and condensing device, the plunger-face is made to descend slightly below the bottom of the feed-hopper 2. To provide a smooth and continuous surface which shall extend from the bottom of the hopper into the baling-chamber to facilitate the entrance of the charge therein and also to prevent the straw and chaff working downward, the plate 19 is provided. This plate is secured to the plunger 8, with respect to which it is movable vertically to a limited extent and is prevented from dropping below the bottom of the feed-hopper by means of the lugs formed by the set-screws 20, secured to the inner face of the baling-chamber. The pins $19'$, engaging with the top of the plunger and having the washers $19^2$ secured to their lower ends, limit the extent of independent movement between the said plate and plunger and insure the plate being positively drawn to its lowest position. When the plunger is raised upwardly, the plate rests against its upper face, as shown by dotted lines in Fig. 4.

Platforms 21, only one of which is shown, are constructed on each side of the feed-hopper for the operators who feed the press, and above the rear end of the feed-hopper 2 is fixed an inclined table 22, on which the bundles are pitched preparatory to being fed into the hopper. At the upper or delivery end of the baling-chamber and on the front side thereof a chute 23 is constructed for receiving the bales when discharged from the baling-chamber 1. The guide-strips 24 at the ends of the baling-chamber, in conjunction with the inwardly-deflected guide-strips 25, operate to direct the bale when discharged from the chamber upon the chute 23, as clearly shown in Figs. 1 and 2.

Figures 4, 5:
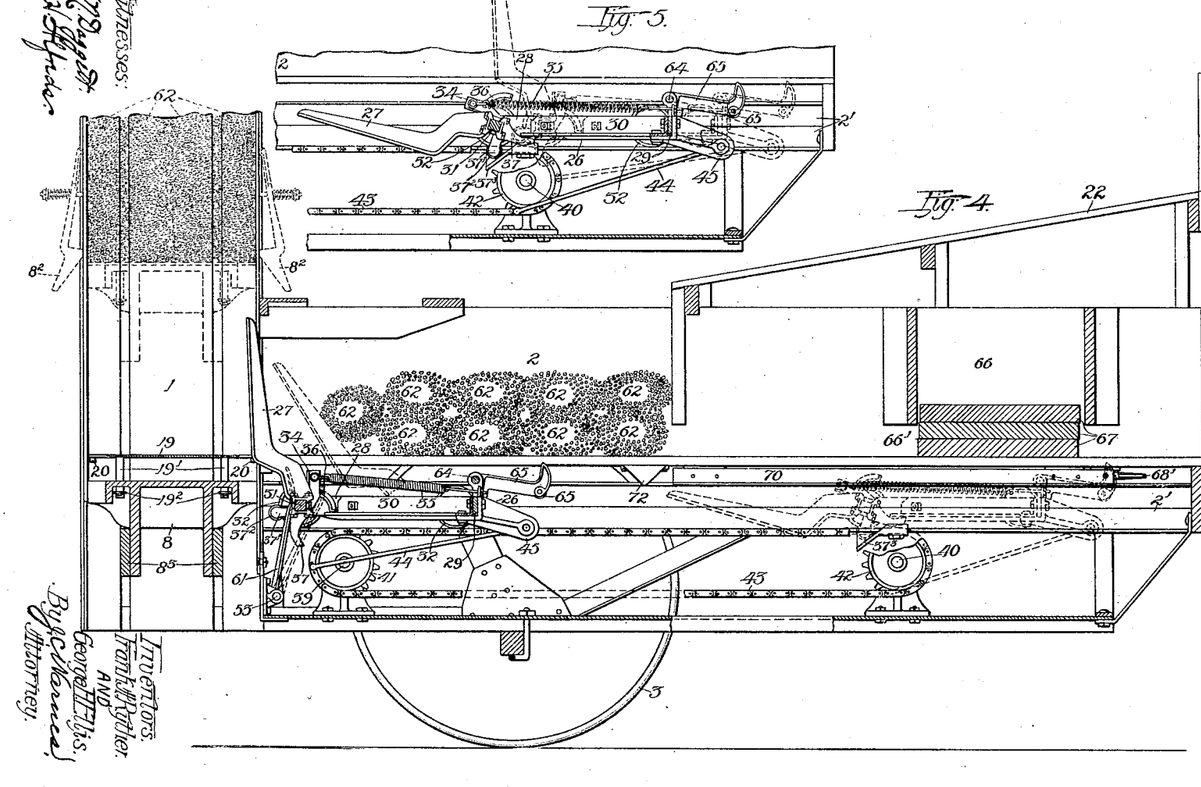
Fig. 4 is a longitudinal section through the feeding and condensing chamber, the section appearing as viewed from the left-hand side of the baler and is designed to show the construction and operation of the feeding device.
Fig. 5 represents a fragmentary view of some of the parts shown in Fig. 4, with the carriage, on which are mounted the straw-engaging fingers, moved to its rearward position.

The feeding and condensing mechanism which with its auxiliary parts constitutes the principal novel features of this invention, is constructed as follows: On each side of the frame of the feed-hopper 2 are secured the opposing angle-bars $2'$, which form a track for the longitudinally-reciprocating carriage or carrier 26, supporting the straw-engaging fingers 27, which project upwardly through the slots $2^2$ in the bottom of said hopper. This carriage 26, which may be regarded as the equivalent of any suitable supporting means for the straw-engaging fingers, is comprised of the side bars 28, the rear bar 29, the brace 30, and the rock-shaft 31, this rock-shaft 31 constituting the front axle of said carriage. Rollers 32 on the rock-shaft 31 and on the rear end of the side bars 28 tend to relieve the carriage of friction against the top and bottom of the track $2'$, while the rollers 33 on the said side bars relieve same of lateral friction. To the rock-shaft 31 is rigidly secured the upwardly-projecting arm 34, (see Figs. 4 and 5,) and between the upper end of this arm and the bar 29 at the rear of the carriage-frame is interposed the spring 35, which tends to hold the fingers 27 in a vertical position. The stop-levers 36, which contact the top of the brace-bar 30, limit the rearward rocking movement of the fingers 27 on the rock-shaft 31, and the downwardly-rocking movement of same beyond the full-line position of the fingers shown in Fig. 5 is prevented by the stop-lever 37. In order to insure the fingers 27 being raised to a vertical position before advancing from their rearward position, positive raising means are provided in the arm $37'$ which is formed, preferably, integral with one of the arms 37. This arm $37'$ has on its free end a roller $37^2$, (see Figs. 7 to 9,) which is arranged to contact the cam-track $37^3$, when the carriage 26 closely approaches the limit of its rearward movement, and forces the said fingers to an upright position in the event the spring 35 should prove inadequate for raising same.

Figures 5, 15:
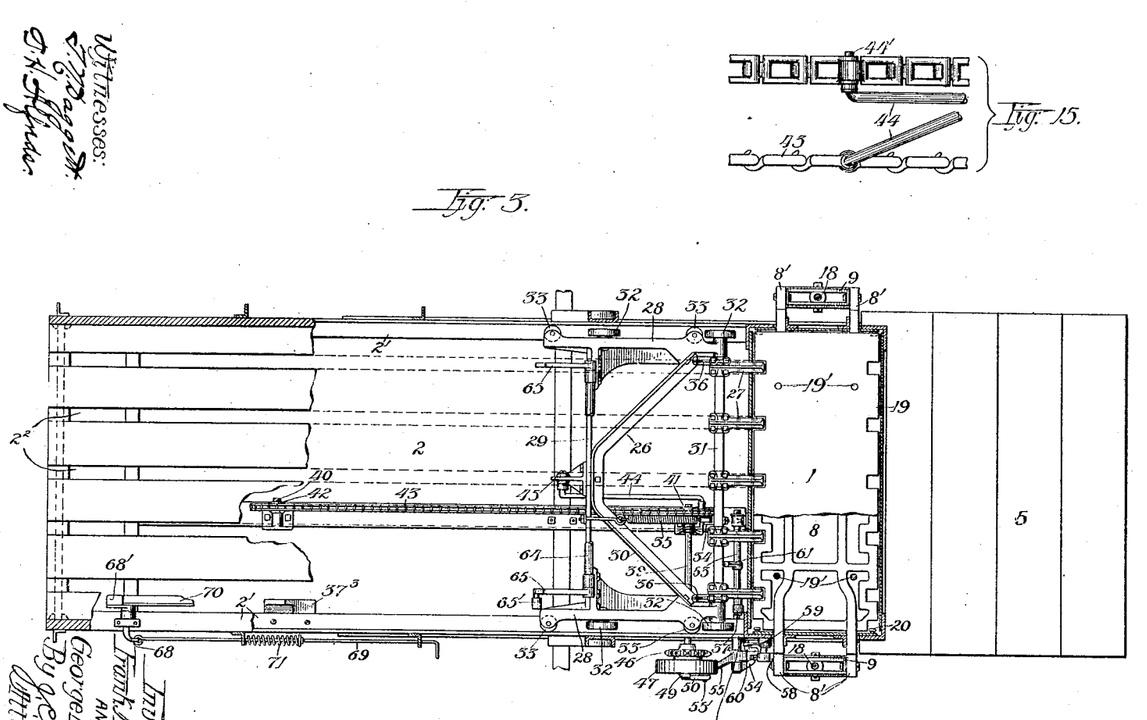
Fig. 15 shows a plan and side elevation of a fragment of the feeder-carriage-driving chain and the link connection therewith.

To impart movement to the reciprocating carriage 26, the following means are employed: A combined driving-pinion and sprocket-wheel 38 is suitably mounted and driven from the pitman-gear 16. In suitable bearings beneath the feed-hopper 2 are journaled the short shafts 39 and 40, to the inner overhanging ends of which are secured, respectively, the sprocket-wheels 41 and 42. The driving-chain 43 engages these sprocket-wheels, and a link 44 (see Figs. 4, 5, and 15) constitutes a driving connection between said chain and carriage 26, the upper end of said link engaging the downwardly and rearwardly projecting arm 45, which is fixed to the frame of said carriage. It will be seen from an inspection of Fig. 4 that the pivotal connection between the link 44 and the arm 45 of the carriage is in line with the upper run of the chain 43, in consequence of which the pull on the chain is direct. As will be seen from the views shown in Fig. 15, the bent end 44' on the lower end of the link 44 is made to serve as the pivotal axis between adjacent links of the chain, thus also applying the pull of said link at its lower end on the chain in a direction extending longitudinally thereof. This form of connection between the chain and link will thus insure a direct pull on the chain when the straw-engaging fingers 37 on the carriage are moving forwardly and doing their work. As soon as the links of said chain, which are connected by the bent end 44' of the link 44, engage the sprocket-wheels 41 or 42 the pull on the link is taken up completely by the sprocket-wheels.

From the above description and an inspection of Figs. 4 and 5 it will be manifest that a movement of the chain 43 will impart a horizontally-reciprocating movement to the carriage 26.

Figure 11:
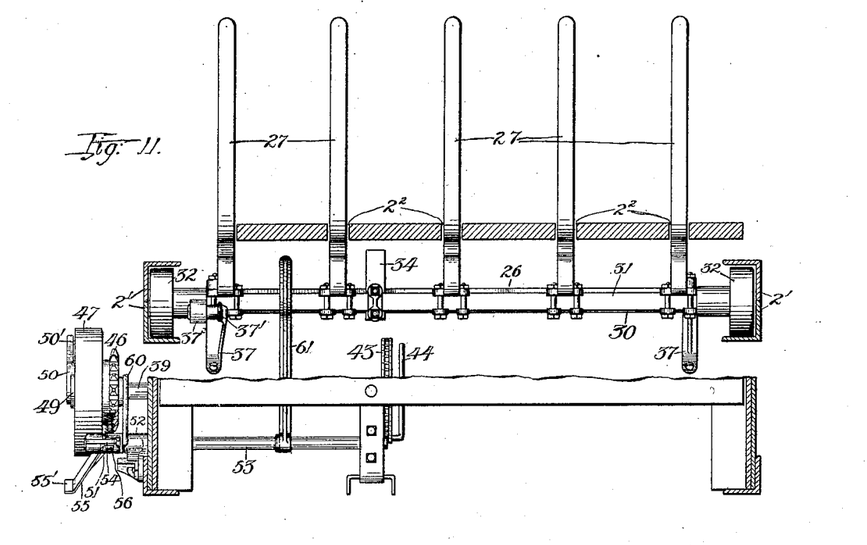
Fig. 11 represents a transverse vertical section through the feeding and condensing chamber, taken on the line 11 11 of Fig. 9.
Figure 14:
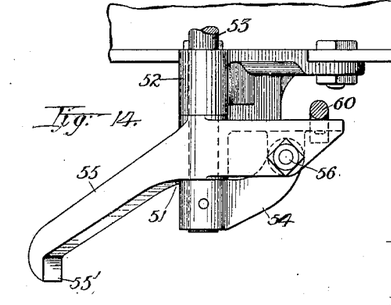
Fig. 14 represents an enlarged detail plan of the trip-lever which engages and releases the dog in the driving mechanism.

On the outer end of the shaft 39 (see Fig. 11) is secured the sprocket-wheel 46, and as one piece therewith is the ratchet-casing 47. A sprocket-chain 48 connects the sprocket-wheel 46 with the combined gear and sprocket wheel 38 and in this manner imparts continuous rotation to the ratchet-casing 47. A clutch-head 49 is fixed to the end of the shaft 39 within the casing 47, and on this clutch-head (see Figs. 7 to 10) is pivotally mounted the spring-actuated driving-dog 50. This driving-dog is arranged to engage the internal teeth 47' in the casing 47 and its normal position is in engagement. The dog 50 is provided with the trip-arm 50', which when restrained in its rotation will disengage the clutch members in the customary manner. To effect this disengagement, the trip-lever 51 is arranged in operative relation with respect to said driving-dog, as clearly illustrated in Figs. 11 and 14. In suitable bearings 52, secured to the frame of the hopper, is the rock-shaft 53, to the outer end of which is fixed the inwardly-curved arm 54. A trip-lever arm 55 is loosely sleeved upon said rock-shaft between the arm 54 and the bearing 52, the free end of this trip-lever arm being provided with the hook 55', adapted to engage the trip-arm 50' of the driving-dog 50. The bolt 56, which engages both the arm 54 and the trip-lever arm 55 in connection with the spring 57, forms a yielding connection between the rock-shaft 53 and said trip-lever arm. In order to release the tripping mechanism and start the feeding and condensing mechanism at a certain definite time in relation to the movement of the plunger, a cam projection 58 is secured to one of the laterally-projecting lugs 8' on the plunger 8, (see Figs. 3 and 7 to 9,) this cam projection being arranged to actuate the bell-crank 59, which connects by means of the rod 60 with the trip-lever arm 55. A spring 63 operates to hold the trip-lever arm 55 out of engagement with the arm 50' of the driving-dog.

Figure 7:
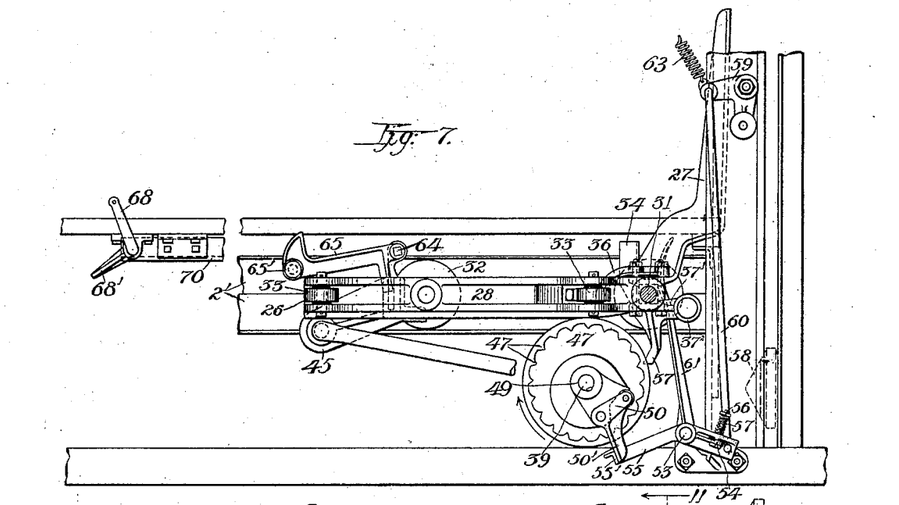
Fig. 7 shows the carriage, on which are mounted the straw-engaging fingers, the carriage being moved to its forward position and the driving-dog having been disengaged from its ratchet, while the trip-cam on the plunger has moved to its lowest position.
Figures 8, 9, 10:
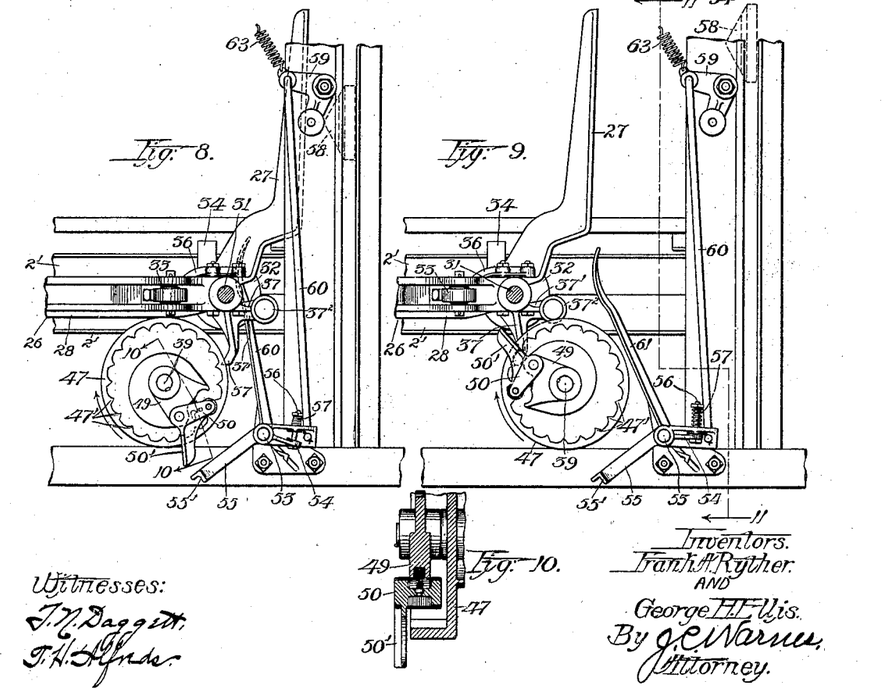
Fig. 8 represents a similar view, with a portion of the reciprocating carriage broken away, and the trip-cam on the plunger in a position to effect the release of the driving-dog and thereby start the feeding and condensing device.
Fig. 9 is a similar view of the same parts in their respective positions after the carriage of the feeding device has completed a portion of its rearward movement.
Fig. 10 is a section taken as indicated by the line 10 10 in Fig. 8 through a portion of the driving-dog and the adjacent ratchet-casing, the view being designed to show the arrangement of the spring which controls the said dog.

To throw the feeding and condensing device out of operation after it has forced the charge into the baling-chamber, a trip-arm 61 is secured rigidly to the rock-shaft 53, the spring 57 affording a yielding connection between this arm 61 and the trip-lever arm 55. The arm 61 projects upwardly and in the path of the reciprocating carriage 26, the forward axle or finger rock-shaft 31 thereof contacting the upper end of said arm, as shown in Fig. 7.

Figure 12:
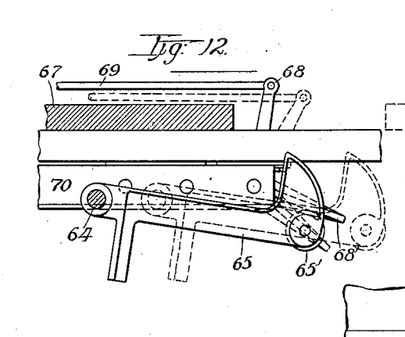
Fig. 12 is a fragmentary longitudinal section designed to illustrate the arrangement and operation of the hook which engages and moves the block forwardly into the baling-chamber.
Figure 13:
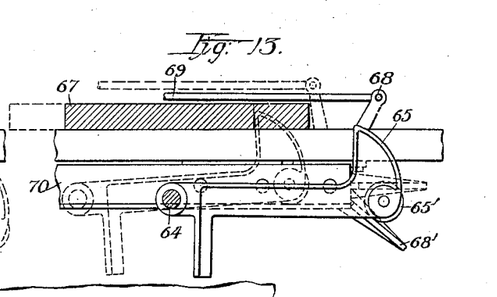
Fig. 13 is a similar view showing the same parts when at a different stage of their movement.

To automatically introduce the blocks into the baling-chamber, a rock-shaft 64 is mounted on the rear end of the carriage 26, and to this rock-shaft is secured the rearwardly-projecting upturned hooks 65, which normally lie below the bottom of the feed-hopper 2. Beneath the table 22 is a magazine 66, in which a number of blocks is placed, an opening 66' being provided at the lower front edge thereof through which the blocks 67 are moved by the hooks 65. In order to lift the hooks when desired and cause them to engage the blocks, there is provided the rocking bell-crank switch 68, having a rearwardly-projecting switch-arm 68'. The bell-crank is so arranged that when depressed the roller 65' on the hook 65 will bear against the under side of said switch-arm 68', as shown in Fig. 12, lifting the same upwardly until the roller passes thereunder, the hook then moving to its extreme rearward position, as shown in dotted lines in the same figure. A rearward thrust is placed upon the rod 69, which operates the bell-crank 68, as indicated by the arrow in Fig. 12, so that as soon as the roller passes from under the switch-arm 68' said arm will be depressed to the dotted-line position of Fig. 12 and to the full-line position of Fig. 13. As the carriage 26 carries the hooks 65 forwardly the rollers 65' thereon will engage the top of the arm 68' and be guided to a position on top of the angle-bar 70, which is secured to the bottom of the hopper 2. The spring 71 operates to hold the bell-crank switch up and in an inoperative position, so that the roller 65' will normally ride beneath the angle-bar 70. It is obvious that when the hook is raised by the bell-crank switch it will engage a block 67 and move it forwardly into the condensing and feeding hopper, from where it will be forced in the succeeding operation into the baling-chamber by the fingers 27. As the carriage reaches the forward end of its stroke the roller 65' will have reached the end of the track formed by the angle-bar 70, and the cam projection 72 (see Fig. 4) will have forced the rear end of the hook 65 downwardly, where it will continue inoperative beneath the bar 70 until it is again raised.

The operation of the baler is of follows: Power being applied to the driving members, continuous reciprocating movement will be imparted to the plunger and an intermittently-reciprocating movement will be given to the feeding and condensing device. Assuming that a charge has been forced by the feeding device into the baling-chamber and the initial upward movement of the plunger has begun, the trip-arm 61 will be in contact with the rock-shaft 31, the straw-engaging fingers will occupy their forward position, and the driving-dog 50 will be out of engagement with the clutch-casing 47, as shown in Fig. 7. The plunger 8 now moves upwardly and when near its upper limiting position the cam projection 58, moving with said plunger, will engage and actuate the bell-crank 59, and through this and the connecting parts the trip-lever arm 55 will be disengaged from the driving-dog 50. As soon as released the driving-dog will be forced into engagement with the ratchet-case 47, thereby imparting movement to the shaft 39 and the driving-chain 43 and the reciprocating carriage 26. The several parts at this stage of the movement will occupy the relative positions shown in Fig. 8 and in which movement of the feeding device is impending. The yielding connection between the trip-lever arm 55 and the trip-arm 61 permits the said lever to be released by the plunger-cam 58 when the arm 61 is in engagement with the rock-shaft 31. The rearward movement of the carriage 26 proceeds and the plunger 8 continues on its upward and return movement, the forwardly-yielding fingers 27 being drawn beneath the bundles 62, which have been placed within the hopper or condensing-chamber 2 and to a position in their rear, as shown by dotted lines in Fig. 4. When moved to this position, the spring 35 will pull them to a vertical position, as shown in dotted lines in Fig. 5, the roller 37² on the arm 37' by contacting the cam-track 37³ positively insuring such movement. The lower end of the link link 44 has now passed around the rear sprocket-wheel 42, and forward movement of the carriage 26 and the fingers thereon now begins. The bundles 62, which have been laid in front of the fingers 27, are now pressed forwardly and condensed, the movement of the feeding device and plunger 8 being so timed that as the bundles are pressed into the forward end of the hopper the plunger will have descended, and the continued movement of the fingers will condense the charge and press the same into the baling-chamber. When the reciprocating carriage 26 has almost completed its forward movement, the finger-bar 31 will contact the trip-arm 61 and disengage the driving-dog in the manner heretofore explained. The feeding device will then remain stationary until the cam projection 58 trips the driving-dog and the operation is repeated, the fingers 27 forming one side of the baling-chamber. When it is desired to introduce a block, the bell-crank switch 68 is depressed by the operator through the rod 69 until the switch-arm 68' engages the roller 65' on the hook 65 in the first succeeding forward movement of the finger-carriage 26. This will cause the hook 65 to be raised above the bottom of the hopper 2 and made to engage the lower block 67 in the magazine 66, forcing it through the gate 66' and into the hopper, where it will be engaged by the fingers 27 on their next stroke forwardly and forced into the baling-chamber.

What we claim as our invention, and desire to secure by Letters Patent, is—

1. In a baling-press, in combination, a vertically-disposed baling-chamber, a horizontally-arranged feed-hopper communicating with one end thereof, and a horizontally-reciprocating feeding and condensing device in operative relation with respect to said feed-hopper.

2. In a baling-press, in combination, a vertically-disposed baling-chamber, a horizontally-arranged feed-hopper communicating with the lower end thereof, and a horizontally-reciprocating feeding and condensing device in operative relation with respect to said feed-hopper.

3. In a baling-press, in combination, a vertically-disposed baling-chamber, a horizontally-arranged feed-hopper communicating with the end thereof, a feeding and condensing device comprising horizontally-reciprocating straw-moving means and suitable mechanism for actuating said means.

4. In a baling-press, in combination, a vertically-disposed baling-chamber, a horizontally-arranged feed-hopper communicating with the end thereof, a feeding and condensing device comprising horizontally-reciprocating straw-moving fingers and suitable mechanism for actuating said fingers.

5. In a baling-press, in combination, a vertically-disposed baling-chamber, a horizontally-arranged feed-hopper communicating with the lower end thereof, and a feeding and condensing device comprising a horizontally-reciprocating carriage provided with straw-engaging fingers and suitable mechanism for actuating said carriage.

6. In a baling-press, in combination, a vertically-disposed baling-chamber, a horizontally-arranged feed-hopper communicating with the end thereof, and a feeding and condensing device comprising a horizontally-reciprocating carriage provided with forwardly-yielding fingers, and suitable means for operating said carriage.

7. In a baling-press, in combination, a vertically-disposed baling-chamber, a horizontally-arranged feed-hopper communicating with the end thereof, and a feeding and condensing device comprising a horizontally-reciprocating carriage provided with forwardly-yielding fingers, a feeder-driving chain, and a link connection between said chain and carriage.

8. In a baling-press, in combination, a vertically-disposed baling-chamber, a horizontally-arranged feed-hopper communicating with one end thereof, a feeding and condensing device comprising a carriage provided with forwardly-yielding fingers, and means for imparting an intermittent horizontally-reciprocating movement to said carriage.

9. In a baling-press, in combination, a vertically-disposed baling-chamber, a horizontally-arranged feed-hopper communicating with one end thereof, a feeding and condensing device comprising a horizontally-reciprocating carriage provided with forwardly-yielding fingers, an intermittently-operated driving-chain, and a link connection between said chain and carriage.

10. In a baling-press, in combination, a vertically-reciprocating plunger, a horizontally-disposed feed-hopper, a feeding device in operative relation with respect to said hopper, driving means for operating said feeding device, and tripping mechanism for rendering said driving means inoperative, said tripping mechanism being actuated by the plunger to start the driving means and by the feeding device to stop the driving means.

11. In a baling-press, in combination, a vertically-reciprocating plunger, a horizontally-disposed feed-hopper, a feeding device, driving mechanism for such feeding device, tripping mechanism including a trip-lever having two arms yieldingly held in relation to each other, and means for actuating said tripping mechanism.

12. In a baling-press, in combination, a vertically-reciprocating plunger, a horizontally-disposed feed-hopper, a feeding device, driving mechanism for such feeding device, and tripping mechanism having two arms yieldingly held in relation to each other, one of said arms being actuated by said feeding device and one by said plunger.

13. In a baling-press, in combination, a vertically-reciprocating plunger, a horizontally-disposed feed-hopper, a feeding device, driving mechanism for such feeding device, and independently-actuated tripping devices for starting and stopping the said mechanism for the feeding device.

14. In a baling-press, in combination, a vertically-disposed baling-chamber, a plunger operating therein, a horizontally-arranged feed-hopper communicating with the lower end of said chamber, a feeding device comprising a horizontally-reciprocating carriage provided with forwardly-yielding fingers, an intermittently-operated driving-chain, and a link connection between said chain and carriage, and a tripping mechanism actuated by said carriage to stop said feeding device and actuated by said plunger to start the feeding device.

15. In a baling-press, in combination, a vertically-disposed baling-chamber, a horizontally-arranged feed-hopper communicating with one end thereof, forwardly-yielding straw-engaging fingers, a block-moving hook, and single means on which said fingers and hook are mounted.

16. In a baling-press, in combination, a vertically-disposed baling-chamber, a horizontally-arranged feed-hopper communicating with the lower end thereof, a horizontally-reciprocating carriage beneath said feed-hopper, forwardly-yielding fingers pivotally mounted on the forward end of said carriage, and a block-moving hook pivotally mounted on the rear end of said carriage.

17. In a baling-press, in combination, a vertically-disposed baling-chamber, a horizontally-arranged feed-hopper communicating with one end thereof, forwardly-yielding straw-engaging fingers, a block-moving hook, and a single reciprocating means arranged below said feed-hopper, on which said fingers and hook are pivotally mounted.

18. In a baling-press, in combination, a vertically-reciprocating plunger, a horizontally-disposed feed-hopper, a feeding device, driving mechanism for such feeding device, and tripping mechanism comprising a rock-shaft, a trip-lever loosely sleeved thereon and having an arm integral with said lever, trip-lever-actuating means connecting the said arm and operated by said plunger, a second arm mounted upon said rock-shaft and yieldingly held in relation to said first arm, the second arm being so arranged as to be actuated by said feeding device.

19. A feeding device for baling-presses comprising a horizontally-reciprocating carriage, a rock-shaft mounted on the forward end thereof, a plurality of forwardly-yielding fingers secured to said rock-shaft, means operating normally to hold said fingers in a vertical position, and intermittently-actuated means for moving said carriage.

20. A feeding device for a baling-press comprising a horizontally-reciprocating finger-support, a plurality of forwardly-yielding fingers secured thereto, means operating normally to hold said fingers in a vertical position, and intermittently-actuated means for moving said finger-support.

21. A feeding device for a baling-press comprising a horizontally-reciprocating carriage, a rock-shaft mounted on the forward end thereof, a plurality of forwardly-yielding fingers secured to said rock-shaft, means operating normally to hold said fingers in a vertical position, and an intermittently-actuated chain link-connected to said carriage for moving same.

22. A feeding device for a baling-press comprising a horizontally-reciprocating carriage, the forward axle thereof constituting a rock-shaft, a plurality of forwardly-yielding fingers secured to said rock-shaft, means operating normally to hold said fingers in a vertical position, and an intermittently-actuated chain link-connected to said carriage for moving same.

23. A feeding device for a baling-press comprising a horizontally-reciprocating carriage, a rock-shaft mounted on the forward end thereof, a plurality of forwardly-yielding fingers secured to said rock-shaft, stops secured to said rock-shaft for limiting the rocking movement thereof, a spring operating normally to hold said fingers in a vertical position, an intermittently-moving chain link-connected to said carriage for moving same, and suitable tripping mechanism for stopping and starting said chain.

24. In a baling-press, in combination, a vertically-disposed baling-chamber, a horizontally-disposed feed-hopper, the bottom of which is provided with a series of longitudinally-extending slots, a horizontally-reciprocating carriage arranged beneath said hopper, and a plurality of forwardly-yielding straw-engaging rocking fingers mounted on said carriage and extending upwardly through the slots in said feed-hopper.

25. In a baling-press, in combination, a vertically-disposed baling-chamber, a plunger operating therein, a horizontally-arranged feed-hopper communicating with the lower end of said chamber, a feeding and condensing device in operative relation with respect to said hopper, said device including a horizontally-reciprocating carriage and forwardly-yielding fingers mounted thereon, and positive means for raising said fingers to a vertical position as the said carriage approaches its rearward position.

26. In a baling-press, in combination, a vertically-disposed baling-chamber, a plunger operating therein, a horizontally-arranged feed-hopper communicating with the lower end of said chamber, a horizontally-reciprocating carriage, fingers pivotally mounted thereon, stops for limiting the movement of said fingers to a vertical or forwardly-prostrate position, a spring tending normally to hold the fingers upright, and a cam engaged by a projecting arm in connection with said fingers for positively raising same to a vertical position as said carriage approaches its rearward position.

27. In a baling-press, in combination, a vertically-disposed baling-chamber, a horizontally-arranged feed-hopper communicating with the lower end thereof, a feeding and condensing device comprising a horizontally-reciprocating carriage provided with forwardly-yielding fingers, an intermittently-operated driving-chain, a link connecting said chain and carriage, the pivotal connection between said link and carriage being in alinement with the upper run of said chain, and driving means for said chain.

28. In a baling-press, in combination, a vertically-disposed baling-chamber, a horizontally-arranged feed-hopper communicating with the lower end thereof, a feeding and condensing device comprising a horizontally-reciprocating carriage provided with forwardly-yielding fingers, an intermittently-operated driving-chain, a link connecting said chain and carriage, the pivotal connection between said link and carriage being in alinement with the upper run of the said chain, and the connection of the link with the chain being formed by a bent end of said link, which is made to form the pivotal axis between the adjacent links, and driving means for said chain.

29. In a baling-press, in combination, a vertically-disposed baling-chamber, a horizontally-disposed feed-hopper, the bottom of which is provided with a series of longitudinally-extending slots, a horizontally-reciprocating carriage arranged beneath said feed-hopper, the forward axle of said carriage being formed by a rock-shaft, a plurality of forwardly-yielding straw-engaging fingers mounted on said rock-shaft and extending upwardly through the slots in said feed-hopper, a projecting arm on said carriage, a driving-chain, a link connection between said arm and driving-chain, means for imparting movement to the driving-chain, and a trip-lever actuated by contact with said rock-shaft on the carriage for disengaging said means from the driving-chain.

30. In a baling-press, in combination, a vertically-disposed baling-chamber, a horizontally-arranged feed-hopper communicating therewith, a vertically-reciprocating plunger operating in said baling-chamber, the engaging face of said plunger descending some distance below the bottom of said feed-hopper, and a plate secured to the top of said plunger and vertically movable to a limited extent in relation thereto, the lower limit of travel of said plate being substantially flush with the bottom of said feed-hopper.

31. In a baling-press, in combination, a vertically-disposed baling-chamber, a horizontally-arranged feed-hopper communicating therewith, a vertically-reciprocating plunger operating in said baling-chamber, said plunger when in its lowest position lying with its top some distance below the bottom of said feed-hopper, a plate secured to the top of said plunger and vertically movable to a limited extent in relation thereto, and means for preventing said plate from descending below the bottom of the feed-hopper.

32. In a baling-press, in combination, a vertically-disposed baling-chamber, driving-gears secured to the sides thereof, a reciprocating plunger operating in said baling-chamber, said plunger having laterally-extending lugs projecting through the sides of the baling-chamber, a pitman connection between said driving-gears and plunger-lugs, a horizontally-arranged feed-hopper communicating with the lower end thereof, and a horizontally-reciprocating feeding and condensing device in operative relation with respect to said feed-hopper.

33. In a baling-press, in combination, a baling-chamber, a feed-hopper, a feeding device operating in said hopper, a feed-table in the rear of said hopper, a magazine beneath said table in which is contained a plurality of blocks, and means for conveying said blocks individually from said magazine to a position in which they will be engaged by the feeding device and delivered to said baling-chamber.

34. In a baling-press, in combination, a baling-chamber, a magazine in which is received a plurality of blocks, means for conveying blocks from said magazine to the feeding device, and a feeding device for moving said blocks to the baling-chamber, said feeding device, when in its forward position, constituting one of the walls of said baling-chamber.

35. In a baling-press, in combination, a baling-chamber, a feed-hopper in which is placed the charge of straw, a magazine in which is contained a plurality of blocks, means for conveying the blocks individually from said magazine to the bottom of said hopper, and a feeding device operating in said hopper for simultaneously moving both the blocks and the charge of hay into said baling-chamber.

36. In a baling-press, in combination, a baling-chamber, a feeding device, a magazine in which is contained a plurality of blocks, and means operating in conjunction with said feeding device for taking a single block from said magazine and delivering it to said baling-chamber.

37. In a baling-press, in combination, a baling-chamber, a feeding device, a magazine in which is contained a plurality of blocks, and means for taking a single block from said magazine and delivering it to said feeding device.

38. In a baling-press, in combination, a baling-chamber, a magazine in which is contained a plurality of blocks, and means for taking a single block from said magazine and delivering it to said baling-chamber.

FRANK A. RYTHER.
GEORGE H. ELLIS.

Witnesses with respect to the signature of Frank A. Ryther:
A. W. REBMAN,
J. C. WARNES.

Witnesses with respect to the signature of George H. Ellis:
MARGARET A. SWEENEY,
J. C. WARNES.